Feb. 15, 1966     M. F. TEPNER     3,235,651
APPARATUS FOR MAKING PRESSURE BYPASS CONNECTIONS TO
PLASTIC-SHEATHED CABLES
Filed June 17, 1963     4 Sheets-Sheet 1
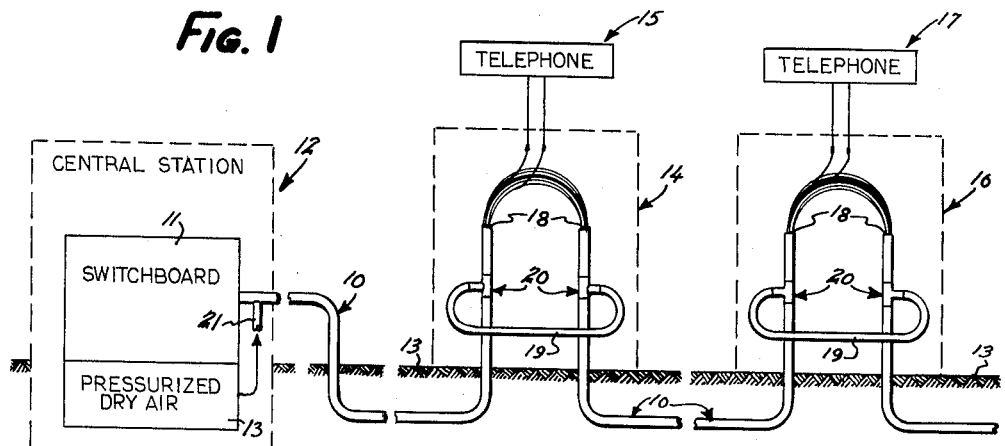
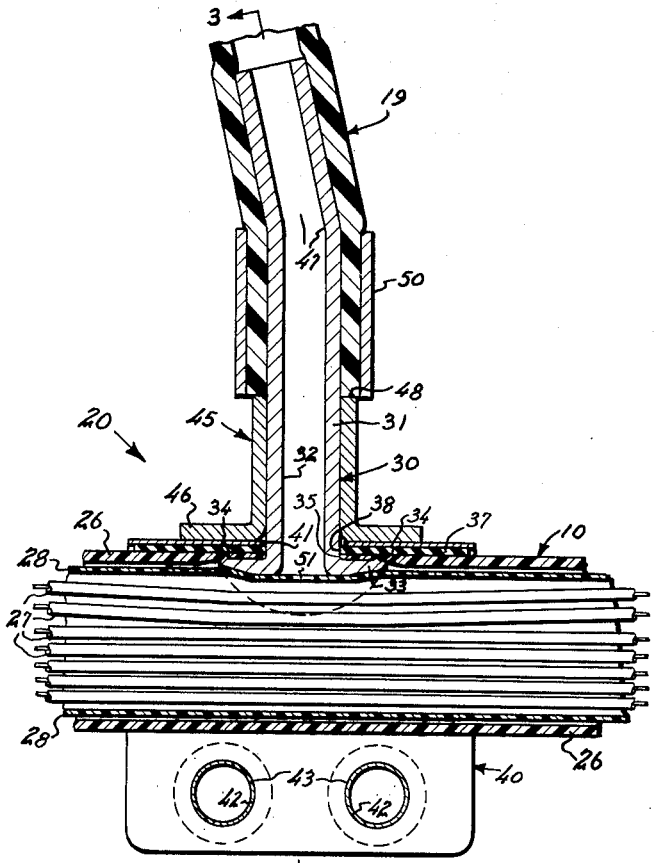
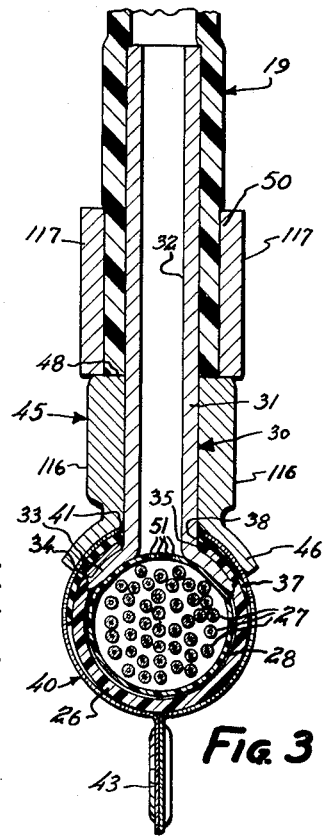
INVENTOR.
MARVIN F. TEPNER Feb. 15, 1966 M. F. TEPNER 3,235,651
APPARATUS FOR MAKING PRESSURE BYPASS CONNECTIONS TO
PLASTIC-SHEATHED CABLES
Filed June 17, 1963 4 Sheets-Sheet 2
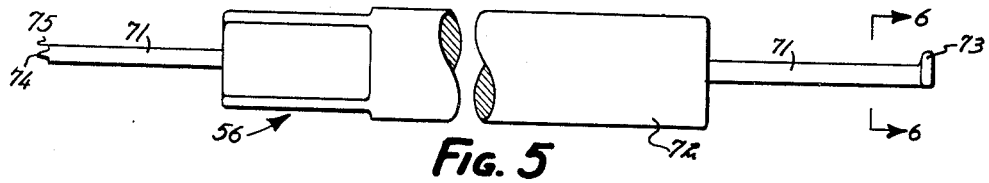
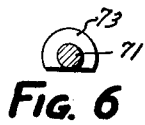
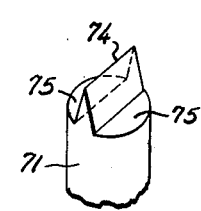
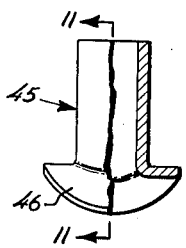
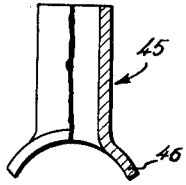
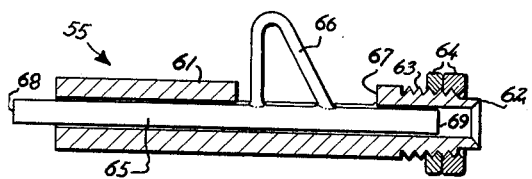
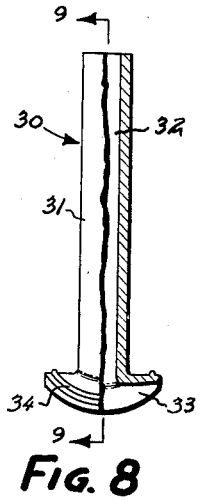
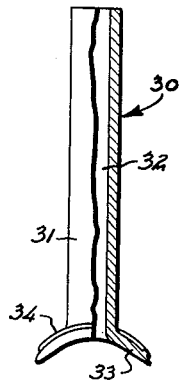
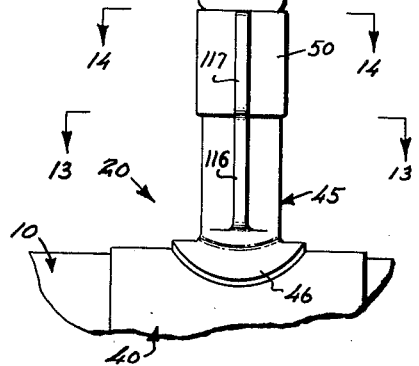
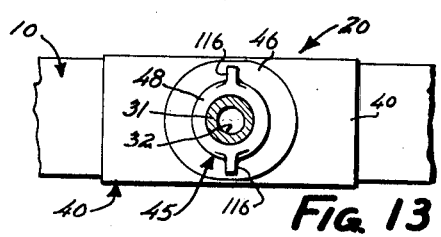
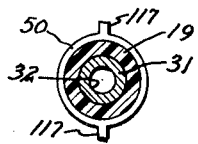
INVENTOR.
MARVIN F. TEPNER
BY
Mellin and Hanscom
ATTORNEYS INVENTOR.
MARVIN F. TEPNER
BY
Mellin and Hauscom
ATTORNEYS Feb. 15, 1966     M. F. TEPNER     3,235,651
APPARATUS FOR MAKING PRESSURE BYPASS CONNECTIONS TO
PLASTIC-SHEATHED CABLES Filed June 17, 1963     4 Sheets-Sheet 4

INVENTOR.
MARVIN F. TEPNER
BY
Mellin and Hanscom
ATTORNEYS

United States Patent Office 3,235,651
Patented Feb. 15, 1966

3,235,651
APPARATUS FOR MAKING PRESSURE BYPASS CONNECTIONS TO PLASTIC-SHEATHED CABLES
Marvin F. Tepner, Plainview, Nebr.
Filed June 17, 1963, Ser. No. 288,121
10 Claims. (Cl. 174—21)

This invention relates to improvements in making branch connections to plastic conduits, and more specifically to a method and apparatus for installing a pressure bypass connection to a plastic-sheathed telephone cable to enable the conduit to be pressurized.

It has long been realized that gas pressurization of telephone cables is highly desirable to protect such cables against shorting caused by moisture leaking into the cable. Normally, dry gas under a pressure of 5-10 p.s.i. is introduced into a cable to place the cable at a higher internal pressure than ambient to prevent the entry of moisture through any cracks or openings in the cable sheath or casing that may exist.

In a typical telephone system the gas is introduced into the cables at the central station of the system. The cables extend from the central station to all of the telephones serviced by the system. At intervals the cable is brought to a pedestal and the casing is stripped from a section of the cable to expose the telephone wires so that service connections may be made thereto. The cable casing is sealed at each end of the exposed section in order to make the cable pressure tight. In order to maintain the entire cable at a superatmospheric pressure, a pressure bypass connection must then be made to the sealed ends of the cable casing in the pedestal to bypass the exposed section so that the pressurized gas can flow from the central station through the entire cased portion of the cable.

The great bulk of telephone installations in this country utilize lead-sheathed cable and various means have been devised to connect the bypass connections to the lead sheaths of the cables so that the cable systems could be pressurized. Developments in recent years have introduced different variations in cable construction; for example, paper-insulated conductors in plastic-sheathed cables and plastic-insulated conductors encased in plastic-sheathed cables. It has been desired to use these plastic-sheathed cables in a pressurized system but the major difficulty has been that, in spite of various attempts, no way has been devised to make satisfactory field installations of the necessary pressure bypass connections to the relatively thin plastic sheaths of such cables.

It is the primary object of this invention to provide a method and apparatus for making pressure bypass connections to plastic-sheathed telephone cables.

A further object is to provide pressure bypass connections for plastic-sheathed telephone cables which can be made quickly and inexpensively in the field without the necessity for prolonged instruction in the making of such connections.

A further object is to provide a bypass connection for plastic-sheathed telephone cables which can be made without the use of heat or solvents which might be deleterious to the cable, and which can be made without decreasing the strength of the cable.

Other objects and advantages will become apparent in the course of the following detailed description.

In the drawings forming a part of this application, and in which like parts are designated by like reference numerals throughout the same:

FIG. 1 is a generally schematic illustration of a telephone system utilizing the pressure bypass connection of the invention.

FIG. 2 is a longitudinal sectional view of a portion of a telephone cable and a connection thereto made in accordance with the principles of the invention, in which the thickness of various portions of the telephone cable have been exaggerated for purposes of illustration.

FIG. 3 is a section view of the telephone cable and connection taken on line 3—3 of FIG. 2.

FIG. 4 is a sectional view of the casing cutter used to form a hole in the wall of the casing of the telephone cable.

FIG. 5 illustrates the tool used to enlarge the hole in the casing and to puncture the inner plastic film of the cable.

FIG. 6 is a sectional view of the tool illustrated in FIG. 5, taken on line 6—6.

FIG. 7 is an enlarged perspective view of one end of the tool illustrated in FIG. 5.

FIG. 8 is a three-quarter elevational view of the core member used in making the bypass connection.

FIG. 9 is a three-quarter view of the core member, with the sectional portion of the view being taken on line 9—9 of FIG. 8.

FIG. 10 is a three-quarter elevational view of the outer member used in making the bypass connection.

FIG. 11 is a three-quarter view of the outer member, with the sectional portion of the view being taken on line 11—11 of FIG. 10.

FIG. 12 is an elevational view of the bypass connection illustrating the manner in which the outer member is gripped to the core member.

FIG. 13 is a sectional view taken on line 13—13 of FIG. 12.

FIG. 14 is a sectional view taken on line 14—14 of FIG. 12.

Figures 15, 16, 17, 18:
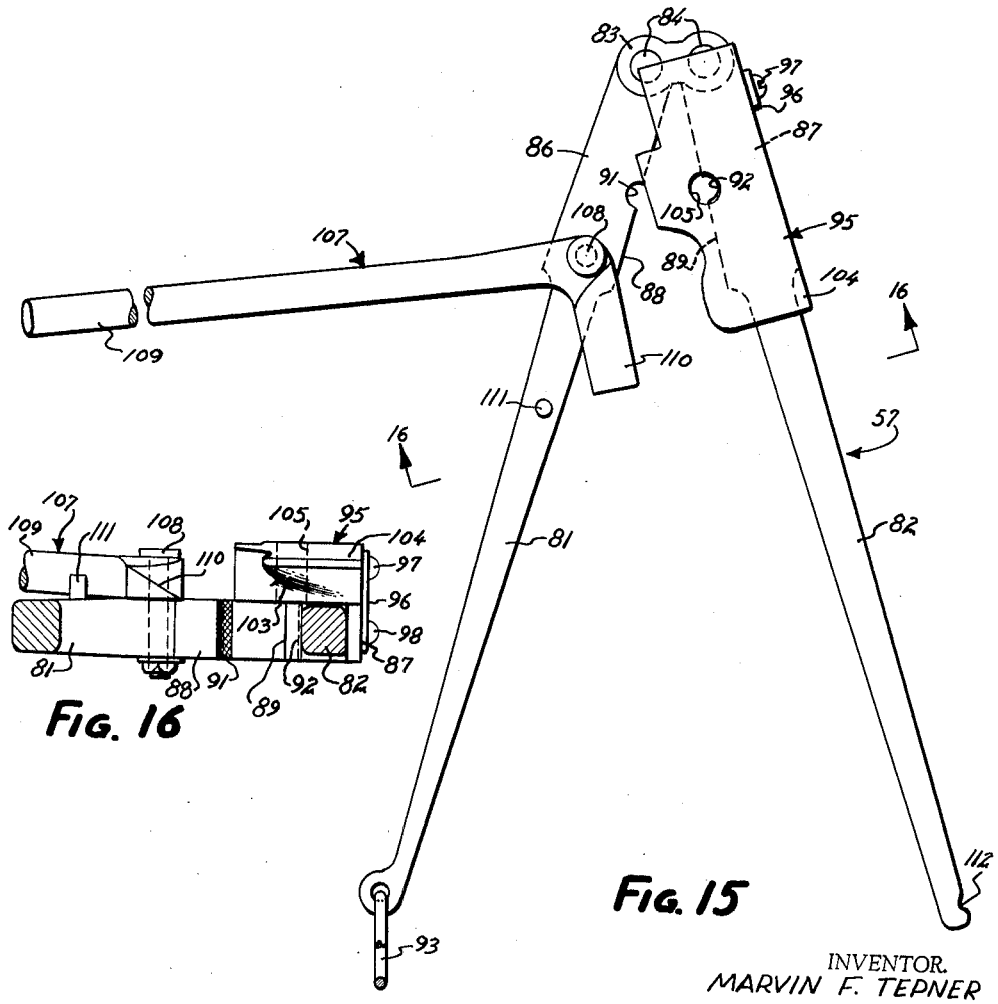
FIG. 15 is a top view of the compression tool used in making the bypass connection.
FIG. 16 is a sectional view of the tool illustrated in FIG. 15, taken on line 16—16 thereof.
FIGS. 17 and 18 are side views of the tool illustrated in FIG. 15, showing the operating positions of the compression member of the tool.

Referring now to the drawings, wherein is illustrated a preferred embodiment of the invention, FIG. 1 shows a typical telephone installation utilizing the pressure bypass connections of the invention. A plastic-sheathed telephone cable 10 is connected to the switchboard 11 at the central station 12 and extends from the station under the ground 13 to a pedestal 14. The cable is brought up into the pedestal, and the cable sheath or casing is stripped away to expose the telephone wires in the cable so that the proper pair can be connected to a telephone 15. The cable 10 then extends underground to the next pedestal 16, wherein the telephone wires are again exposed so that a service connection can be made to telephone 17. The cable 10, of course, then extends to all of the other telephones serviced by the cable.

In each pedestal, the exposed ends of the cable sheath are sealed in a well-known manner at 18, by epoxy resin or the like, to prevent moisture from entering the sheathed portions of the cable. As will be apparent, the cable 10 is thus comprised of a series of sheathed portions extending between the central station and the succeeding pedestals.

The sealed ends of the cables are placed in internal pressure communication in each pedestal by means of the tubings 19, which connect to the bypass inserts, generally shown at 20, secured to the plastic sheath of the cable.

A tap connection 21 to the cable is provided at the central station to enable pressurized gas from source 13 to be introduced into the interior of cable 10. The pressure of this gas will be communicated through the interstices between the telephone wires in the cable and through the bypass tubings 19 to pressurize the entire system. Once pressurized, there will be no gas flow through the cable, but a static pressure will exist therein. Even if one or more small pin-point leaks in the cable should exist, the minimal flow of gas therefrom would not be sufficient to cause the system to lose its protective pressure as long as the source 13 supplies sufficient make-up pressure.

THE BYPASS CONNECTION

The construction of the cable 10 is best shown in FIGS. 2 and 3. As will be seen, the cable 10 is a standard telephone cable, and comprises an outer resilient plastic sheath or casing 26. A plurality of insulated telephone conductors 27 are carried within the casing 26 and are all wrapped together in a tough plastic film 28, typically Mylar. The diameter of the casing 26 is determined by the number of telephone conductors carried by the cable. For a 25-pair cable, the outer diameter of the casing is in the order of one-half inch and the casing thickness is in the order of $1/16$ inch.

The bypass inserts 20 comprise a core member 30, shown in FIGS. 2, 3, 8 and 9, having an elongated shank 31 provided with a flow passage 32 therethrough and formed with an enlarged flange 33 at one end thereof. This flange is curved, as best seen in FIG. 9, with a radius of curvature essentially equal to the radius of curvature of the inner surface of the casing 26. A small rib 34 is formed on and around the upper surface of the flange adjacent the edge thereof. The core member is preferably formed from a suitable copper alloy. The flange of the core member sits between the plastic film 28 and the casing 26 with the upper surface of the flange in full contact with the inner surface of the casing. The shank 31 extends outwardly from the casing through a hole 35 in the casing.

Figure 20:
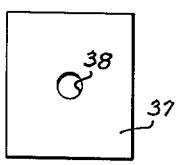
FIG. 20 illustrates the packing material used in making the bypass connection.

A deformable packing member 37, shown in FIGS. 2, 3 and 20, is preferably of rectangular shape with a central hole 38 therethrough to enable the packing member to fit onto the shank 31 of the core member and be in contact with the outer surface of casing 26. The packing member 37 may be of rubber, plastic, leather, or the like.

Figure 19:
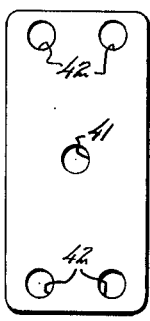
FIG. 19 illustrates the retaining band used in making the bypass connection.

A generally rectangular retaining band 40, preferably formed from a suitable copper alloy, and best shown in FIGS. 2, 3 and 19, is provided with a central hole 41, for the reception of shank 31 of the core member 30, and end holes 42. The retaining band extends circumferentially around the casing 26, and is tightly secured in place by rivets 43. This band serves to restrain any circumferential expansion of the cable in the vicinity of the bypass connection when the system is pressurized.

An outer tubular member 45 is telescoped onto the shank 31 of the core member 30, and has an enlarged-diameter flange 46 on one end thereof. The flange 46 is curved, as best seen in FIG. 11, so that the lower surface of the flange conforms to the curvature of the outer surface of the casing 26. The member 45 is preferably formed from a suitable copper alloy.

As best seen in FIG. 2, the upper end of shank 31 of the core member 30 projects from the outer member 45 and is bent at 47 at a point spaced from the upper shoulder 48 of the outer member. The resilient plastic bypass tubing 19 is telescoped onto the exposed end of the shank 31 and is stopped by the upper shoulder 48 of the outer member. The tubing 19 is held in place by a retaining ring 50 which is disposed about the tubing and located between the outer member 45 and the bend 47 in the shank 31.

The plastic film 28 is perforated at 51 adjacent the passage 32 through the core member 30 so that the bypass tubing 19 is in pressure communication with the interstices between the telephone wires 27.

INSTALLATION TOOLS

The special tools that have been designed to make the bypass connection illustrated in FIG. 2 are the casing cutter 55, the hole enlarger and film perforator 56, and the compression tool 57.

Casing cutter 55

The casing cutter 55, illustrated in FIG. 4, comprises a tubular shank 61 adapted to be received within the chuck of a standard $1/4$-inch power drill and provided with a sharpened end 62 designed to cut a hole of a diameter equal to the outer diameter of the shank 31 of the core member 30. The shank 61 is threaded at 63 to receive nuts 64 thereon which can be locked together to provide a depth adjustment for the cutter. A plug ejector 65 is slidably mounted in the shank 61 and is provided with a finger-operable handle 66 projecting from a longitudinal window 67 in the shank 61. The plug ejector has an end 68 projecting from the shank 61 which may also be used for depth adjustment purposes.

Hole enlarger and film perforator 56

The hole enlarger and film perforator 56, illustrated in FIGS. 5, 6 and 7, comprises an elongated metal rod 71 projecting from both ends of handle 72. One end of rod 71 is provided with a semi-circular flange 73, best seen in FIG. 6, having a radius larger than the radius of the shank 31 of the core member 30. The other end of rod 71 is provided with a sharpened chisel point 74 extending outwardly from shoulders 75, as best seen in FIG. 7. The distance of the chisel point 74 from the shoulders is sufficient to allow the point to pierce the plastic film 28 without projecting into the interior of the cable 10 any appreciable distance.

Compression tool 57

The compression tool 57, illustrated in FIGS. 15–18, comprises a pair of elongated handle members 81 and 82 pivotally joined together at their ends by links 83 and pins 84. Both handles have head portions adjacent the pivotally connected ends of the handles provided with top surfaces 86 and 87 and side surfaces 88 and 89, respectively.

The side surface 88 of handle 81 has a semi-circular groove 91 formed therein extending from the top surface 86, and a similar groove 92 is formed on handle 82. These grooves are knurled or otherwise roughened, and when the handles 81 and 82 are closed together the grooves form a circular hole of slightly smaller diameter than the diameter of the shank 31 of the core member 30 so that the shank can be securely gripped by the tool 57.

Handle 81 carries a locking ring 93 at the end thereof which is adapted to encompass the adjacent end of handle 82, as seen in FIG. 17, to lock the handles in closed position.

An elongated compression member 95 is disposed on the top surface 87 of handle 82, and is held in place thereon by link 96 and screws 97 and 98, which connect to the compression member and handle, respectively. The holes in link 96 which accommodate screws 97 and 98 are slightly oversize to provide sufficient lost motion to enable the compression member 95 to rock on the handle 82.

As best seen in FIG. 17, the compression member 95 has a transverse shoulder 101 adjacent one end thereof which rests on the upper surface 87 of handle 82. The other end of the compression member has a portion 102 on the lower surface thereof normally resting on the upper surface 87 of handle 82, and is provided with an upwardly extending cam surface 103 extending generally from 102 towards the upper surface 104 of the compression member.

Intermediate the ends thereof, the compression member 95 is provided with a hole 105 therethrough of slightly larger diameter than that of the shank 31 of the core member. When the compression member contacts the upper surface 87 of the handle 82, hole 105 is in axial alignment with the hole formed by grooves 91 and 92 when the handles are closed.

A lever arm 107 is pivotally connected by bolt 108 to the upper surface 86 of handle 81, and has a handle portion 109 formed on one end and a sloping wedge surface 110 formed on the other end thereof. When the handles 81 and 82 are closed together, counterclockwise rotation of lever arm 107 will force the wedge surface 110 thereof between the upper surface 87 of handle 82 and the cam surface 103 of the compression member 95 to rock the compression member in a clockwise direction about its shoulder 101, as shown in FIG. 18. An upwardly extending stop member 111 on handle 81 is provided to engage handle 109 and limit counterclockwise rotation of the lever arm.

When the compression member 95 has been rocked to its position shown in FIG. 18, it will be noted that the axis of compression member hole 105 is inclined at an angle to the axis of the hole formed by grooves 91 and 92.

METHOD OF INSTALLATION OF A BYPASS INSERT

To install a bypass insert in a telephone cable in accordance with the invention, the hole 35 in the casing is first made, by use of the casing cutter 55. The shank of the casing cutter is inserted in the chuck of a power drill and the nuts 64 are adjusted so that the depth of cut will be just sufficient to cut the casing without damaging any of the conductors inside the cable. The hole 35 that is cut will have a diameter equal to that of the shank 31 of the core member. It is intended that the diameter of shank 31 of the core member will be the same for a relatively wide range of size of the cable 10, and thus the same casing cutter may be used on different-size cables. The cut plug can be removed from the casing cutter by means of the plug ejector 65.

Alternatively, the depth of cut may be adjusted by bottoming the plug ejector end 68 in the drill chuck and by positioning the shank 61 in the chuck in such manner that the plug ejector end 69 is spaced from the cutting end 62 of the shank a distance equal to the thickness of the cable casing 26. Then, when the casing is cut, the depth of cut will be stopped when the plug ejector end 69 comes into contact with the casing.

The semi-circular flange 73 of the hole-enlarging tool 56 is then worked into the hole 35 and the tool is manipulated to stretch the casing temporarily within the plastic "memory" of the casing adjacent the hole and to enlarge a diameter of the hole so that the enlarged-diameter flange 33 of the core member 30 can be inserted through the hole 35. The plastic material used in the casing 36 can be temporarily stretched, but the inherent memory of the material will cause it to creep back gradually to resume its original unstretched shape.

The enlarged flange 73 of tool 56 is removed from the casing hole, the tool is reversed and the sharpened chisel point 74 is inserted through the hole and pressed against the tough plastic film 28 to puncture the film. The chisel point 74 is positioned so that it is parallel to the conductors 27, which allows the point 74 to slip between the conductors as the puncture is made, thereby avoiding damage to the conductors. The shoulders 75 of tool 56 limit the movement of end 74 through the film 28 to additionally protect the conductors. Several punctures are made to insure adequate pressure communication between the interior of film 28 and the casing 26. If desired, this step can be performed before the last-described step of stretching the casing.

The flange 33 of the core member is then worked through the temporarily stretched hole 35, leaving the shank 31 projecting from the hole. The shank 31 is positioned so that the curved flange 33 is in full surface contact with the inner surface of the casing, i.e., with the axis of the curvature of flange 33 being coaxial to cable 10. Although this position is easy to determine by feel, an index mark could be made on the shank 31 to indicate the position of the flange 33. The mechanical pressure between the conductors and the cable casing will then hold the core member in proper position to permit the following steps to be made.

In the event that a different-size cable is to be worked upon, a different core member 30 will be used having a flange curvature equal to the inner curvature of the casing.

The packing member 37 is then put into place in contact with the outer surface of the casing, with the shank 31 projecting through the packing hole 38.

The retaining band 40 is then wrapped around the casing and the ends thereof are secured by rivets 43 to grip the casing tightly.

Figure 21:
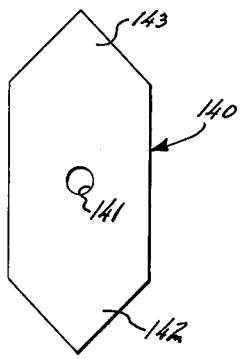
FIG. 21 illustrates a modified form of retaining band usable in making the bypass connection.
Figure 22:
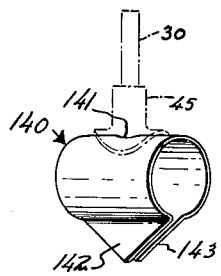
FIGS. 22, 23, 24 and 25 illustrate the manner in which the retaining band shown in FIG. 21 is applied.
Figure 23:
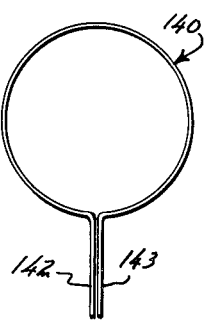
Figure 24:
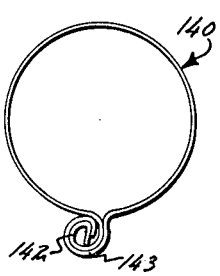
Figure 25:
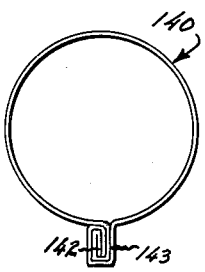
Figure 26:
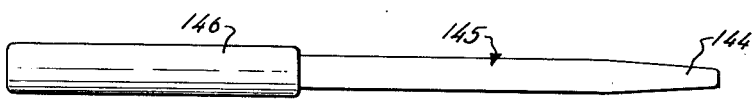
FIGS. 26 and 27 are top and side views of a tool used in applying the retaining band shown in FIG. 21.
Figure 27:
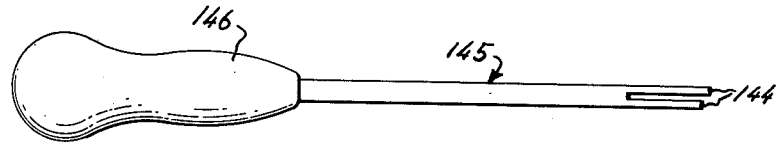

If desired, an alternate form of retaining band 140, illustrated in FIG. 21, may be employed. The band 140 is positioned on the casing, with the core member shank 31 projecting through restraining band hole 141, and the band is wrapped around the cable so that the band ends 142 and 143 are adjacent each other, as shown in FIGS. 22 and 23. The band ends are inserted between the bifurcated ends 144 of tool 145, and the handle 146 is rotated to wind the band ends 142 and 143 up tightly, as shown in FIG. 24. The tool 145 is withdrawn, and the band ends are clenched with a pair of pliers, as shown in FIG. 25. This band has an advantage in that it compensates for variations in casing circumference and allows the band to be tightly secured to the casing.

The retaining bands 40 or 140 are provided to restrain the cable from circumferential expansion due to the superatmospheric pressure therein, which might otherwise place an undue strain on the casing immediately adjacent the core member. Additionally, the retaining band provides a mechanical support for the core member, when clamped by the outer member 45, and protects the casing against strains which might occur if a radical force is accidentally applied to the protruding shank 31 of the core member.

The outer member 45 is then telescoped onto the shank 31 and is positioned on the retaining band so that the curved lower surface of the flange 46 is in full contact with the retaining band. The curved flanges of the outer member 45 and the core member 30 will now be in parallelism. It is of course to be appreciated that if a different core member is used on a different sized cable that a different outer member having a correspondingly different curvature of its flange will be used. This normal inner diameter of the member 45 is just slightly greater than that of shank 31 so that the member 45 fits easily thereon.

By this time, the memory of the plastic casing will have caused the casing to return from its temporarily stretched condition to its original shape and the casing will be in contact with the shank 31 completely therearound.

The compression tool 57 is now used. The lever arm 107 is rotated so that the wedging surface 110 thereof is out of the way of the compression member 95. The handles 81 and 82 are opened, and the tool is manipulated so that the shank 31 extends through the compression member hole 105 and the upper surface 104 of the compression member 95 abuts the end 48 of the outer member. Handles 81 and 82 are then closed to grip the end of shank 31 by the roughened grooves 91 and 92. The locking ring 93 is slipped over the end of handle 82 and into groove 112 to lock the handles together.

With the handles held still, the lever arm 107 is then rotated into engagement with the stop member 111 to move the wedging surface 110 thereon into engagement with the cam surface 103 of the compression member to force the compression member away from the handle 82. Since the shank 31 is gripped by handles 81 and 82, and since the outer member 45 is abutted by the upper surface of compression member 95, the shank and outer members will be forced in opposite directions to force the flanges thereon together. The casing 26 will thus be very tightly gripped between the flanges 33 and 46. A very effective seal is formed both by the high compressive pressure between the flanges and by means of the rib 34 on the upper surface of flange 33 which embeds itself into the casing wall. Additionally, the compressive force between the flanges will cause the deformable packing member 37 to flow somewhat towards the core member and into effective sealing engagement between the core member and the outer member 45.

Although it is preferable to use the deformable packing member 37 for maximum sealing, effective sealing can still be obtained if this element is omitted. The plastic casing 26 itself is deformable and the compression of the casing between the flanges 33 and 46 will cause the casing to deform therebetween, tending to reduce the diameter of the casing hole 35 so that the casing flows into sealing contact with the shanks of the core member and the outer member 45. The rib 34 on the upper surface of the core member flange 33 assists in this operation, since it aids in preventing the compressed casing between the flanges from flowing outwardly from the casing hole 35.

An important aspect of the compression step is that the core member and outer member are subjected only to longitudinal movement and that there is no relative rotation therebetween. Relative rotation must be avoided, since otherwise the curved flanges 33 and 46 would not be in parallelism after compression, and they would not compress the casing equally around the shank 31, thereby preventing an effective seal.

At the same time that the flanges are compressed together, the compression tool 57 will produce bend 47 in the shank 31, due to the fact that the compression member hole 105 becomes angularly inclined to the hole formed by grooves 91 and 92.

Since the amount of rocking movement of the compression member 95 is dependent solely upon the thickness of the wedging surface 110 of the lever arm 107, it is apparent that the amount of compression in each installation of a bypass insert will be the same to produce uniform results.

With the core member and outer member held in compressed position by the compression tool 57, the outer member is clamped onto the core member by a standard tool such as a "Nicopress" tool. Inasmuch as this is a standard tool, the details thereof have not been illustrated. Nicopress tools are made by The National Telephone Supply Co. of Cleveland, Ohio, and are described in U.S. Patent No. 2,086,400. For the purpose of this disclosure, it is sufficient to state that the jaws of such tool surround the outer member, and when the jaws are closed, it will squeeze the outer member, forming longitudinal wings 116 thereon, as best seen in FIGS. 12 and 13, which has the result of decreasing the inner diameter of the outer member 45 so that it grips the shank 31 of the core member with great force.

With the outer member 45 clenched tightly to the core member 30, the compression tool 57 is unlocked and removed.

A retaining ring 50 is then slid onto the end of the bypass tubing 19, and the tubing is telescoped onto the exposed end of the shank 31. The ring 50 is then slid down on the tubing, past the bend 47 in the shank, and is positioned between the outer member 45 and the shank bend 47. The Nicopress tool is then used to clench the retaining ring 50 securely onto the tubing 19 by reducing the inner diameter of the ring, forming the excess metal into wings 117, as shown in FIGS. 12 and 14.

Since the tubing 19 is formed of resilient plastic, the retaining ring will not form as effective a mechanical connection as is formed between the outer member 45 and core member shank 31. However, the bend 47 in the shank will provide a mechanical lock for the retaining ring 50, since after the reduction in the inner diameter of ring 50 it can no longer slide past the bend in the shank without the application of a much greater force than will exist when the system is subjected to the intended superatmospheric pressure.

It may be desired in some instances to thread the end of shank 31 so that the bypass tubing 19 might be connected thereto by a standard nut connection. In such an event, the threaded end of shank 31 would have to be sufficiently spaced from the outer member 45 so that the threads are not damaged by the roughened grooves of compression tool 57.

It will be apparent from the above that the bypass connection described herein can be easily made in the field without cumbersome tools or equipment other than the hand tools mentioned and described herein.

The pressure bypass connection is purely a mechanical connection, and may be put to use immediately. No heat is applied, as might be encountered in a vulcanizing process, and thus any damage that might be caused to the cable through heating is avoided. No solvents are used which might be injurious to the cable or the insulation of the wires within the cable, and of course the delay that would be encountered in waiting for solvents to set is avoided.

It is to be realized that the forms of the bypass connection and the tools and methods used in making the connections that are illustrated and described herein are preferred embodiments of the invention, and that various changes may be made in the shape, size and arrangement of parts and tools and in the steps of making the connection without departing from the spirit of the invention or the scope of the attached claims.

Having thus described my invention what I claim is:

1. A connection of the character described, comprising:

a cable having a resilient plastic casing provided with a radially disposed hole therethrough;

a core member having an elongated shank of an outer diameter equal to the diameter of said casing hole and provided with a longitudinal flow passage therethrough and an enlarged-diameter flange at one end of said shank and integral therewith, said flange having a curved surface to fit the inner surface of said casing, said flange surface being disposed in full contact with the inner surface of said casing, said shank extending outwardly through said casing hole and having a smooth outer surface;

an outer tubular member telescoped onto said shank and provided with an enlarged-diameter flange integral therewith having a curved surface to fit the exterior surface of said casing, said curved surface of said outer member flange being disposed in parallelism with the curved surface of said core member; said casing being tightly compressed between said flanges of said core member and outer member; and said outer member being compressed tightly onto said smooth surface of said core member shank to prevent separation of said flanges.

2. A connection as set forth in claim 1, wherein said shank has an end projecting beyond said outer member, said projecting shank end being bent at a distance from said outer member;
   a plastic tubing telescoped onto said projecting shank end; and
   a restraining collar surrounding said tubing and positioned between said outer member and the bend in said shank, said restraining collar being in tight gripping engagement with said tubing.

3. A connection as set forth in claim 1, wherein said core member flange surface has formed thereon a rib extending therearound adjacent the edge of said flange, said rib being embedded in the inner surface of said casing surrounding the shank of said core member.

4. A connection of the character described, comprising:
   a cable having a resilient plastic casing provided with a radially disposed hole therethrough;
   a core member having an elongated shank of an outer diameter equal to the diameter of said casing hole and provided with a longitudinal flow passage therethrough and an enlarged-diameter flange at one end of said shank and integral therewith, said flange having a curved surface to fit the inner surface of said casing, said flange surface being disposed in full contact with the inner surface of said casing, said shank extending outwardly through said casing hole and having a smooth outer surface;
   deformable packing means surrounding said shank and in contact with the exterior surface of said casing;
   a restraining band tightly fitting and circumferentially extending around said casing, said band having an opening through which said shank projects;
   an outer tubular member telescoped onto said shank and provided wtih an enlarged-diameter flange integral therewith having a curved surface to fit the exterior surface of said casing, said outer member flange surface being disposed in parallelism with the curved surface of said core member;
   said casing and packing means being tightly compressed between said flanges of said core member and outer member; and
   said outer member being compressed tightly onto said smooth outer surface of said core member shank to prevent separation of said flanges.

5. A connection as set forth in claim 4, wherein said shank has an end projecting beyond said outer member, said projecting shank end being bent at a distance from said outer member;
   a plastic tubing telescoped onto said projecting shank end; and
   a restraining collar surrounding said tubing and positioned between said outer member and the bend in said shank, said restraining collar being in tight gripping engagement with said tubing.

6. A connection of the character described, comprising:
   a telephone cable having a resilient plastic casing and a plurality of telephone wires collectively encased in a tough plastic film within said casing, said casing having a radially disposed hole therethrough, said film having an aperture therethrough adjacent said casing hole;
   a core member having an elongated shank of an outer diameter equal to the diameter of said casing hole and provided with a longitudinal flow passage therethrough and an enlarged-diameter flange at one end of said shank and integral therewith, said flange having a curved surface to fit the inner surface of said casing, said flange being disposed between said casing and film and said flange surface being in full contact with the inner surface of said casing, said shank extending outwardly through said casing hole and having a smooth outer surface;
   an outer tubular member telescoped onto said shank and provided with an enlarged-diameter flange integral therewith curved to fit the exterior surface of said casing, said outer member flange being in coaxial relation to said core member flange;
   said casing being tightly compressed between said flanges of said core member and outer member; and
   said outer member having an uncompressed inner diameter slightly larger than the outer diameter of said core member shank to permit longitudinal sliding movement of said outer member on said shank, said outer member being compressed upon and completely around said smooth surface of said shank to prevent separation of said flanges.

7. A connection as set forth in claim 6, wherein said shank has an end projecting beyond said outer member, said projecting shank end being bent at a distance from said outer member;
   a plastic tubing telescoped onto said projecting shank end; and
   a restraining collar surrounding said tubing and positioned between said outer member and the bend in said shank, said restraining collar being in tight gripping engagement with said tubing.

8. A connection as set forth in claim 6, wherein said core member flange surface has formed thereon a rib extending therearound adjacent the edge of said flange, said rib being embedded in the inner surface of said casing surrounding the shank of said core member.

9. A connection of the character described, comprising:
   a telephone cable having a resilient plastic casing and a plurality of telephone wires collectively encased in a tough plastic film within said casing, said casing having a radially disposed hole therethrough, and said film having an aperture therethrough adjacent said casing hole;
   a core member having an elongated shank of an outer diameter equal to the diameter of said casing hole and provided with a longitudinal flow passage therethrough and an enlarged-diameter flange at one end of said shank and inegral therewith, said flange having a curved surface to fit the inner surface of said casing, said flange being disposed between said casing and film and said flange surface being in full contact with the inner surface of said casing, said shank extending outwardly through said casing hole and having a smooth outer surface;
   deformable packing means surrounding said shank and in contact with the exterior surface of said casing;
   a restraining band tightly fitting and circumferentially extending around said casing, said band having an opening through which said shank projects;
   an outer tubular member telescoped onto said shank and provided wtih an enlarged-diameter flange integral therewith having a curved surface to fit the exterior surface of said casing, said outer member flange surface being in parallelism with the curved surface of said core member;
   said casing and packing means being tightly compressed between said flanges of said core member and outer member; and
   said outer member having an uncompressed inner diameter slightly larger than the outer diameter of said core member shank to permit longitudinal sliding movement of said outer member on said shank, said outer member being compressed upon and completely around said smooth surface of said shank to prevent separation of said flanges.

10. A connection as set forth in claim 9, wherein said shank has an end projecting beyond said outer member, said projecting shank end being bent at a distance from said outer member;
  a plastic tubing telescoped onto said projecting shank end; and
  a restraining collar surrounding said tubing and positioned between said outer member and the bend in said shank, said restraining collar being in tight gripping engagement wtih said tubing.

References Cited by the Examiner
UNITED STATES PATENTS

| | | | |
|---|---|---|---|
| 1,159,806 | 11/1915 | Scism | 81—15 |
| 2,328,373 | 8/1943 | Bogardus | 174—71 |
| 2,376,324 | 5/1945 | Bogardus | 174—71 |
| 2,572,738 | 10/1951 | Livinggood | 81—15 |
| 2,736,949 | 3/1956 | Kraemer | 29—157 |
| 3,070,874 | 1/1963 | Davis | 29—157 |

FOREIGN PATENTS 566,954   1/1945   Great Britain.

JOHN F. BURNS, *Primary Examiner.*
JOHN P. WILDMAN, *Examiner.*